May 6, 1941.  H. W. HEM  2,241,349
WEIGHING SCALE
Filed Aug. 9, 1939  2 Sheets-Sheet 1
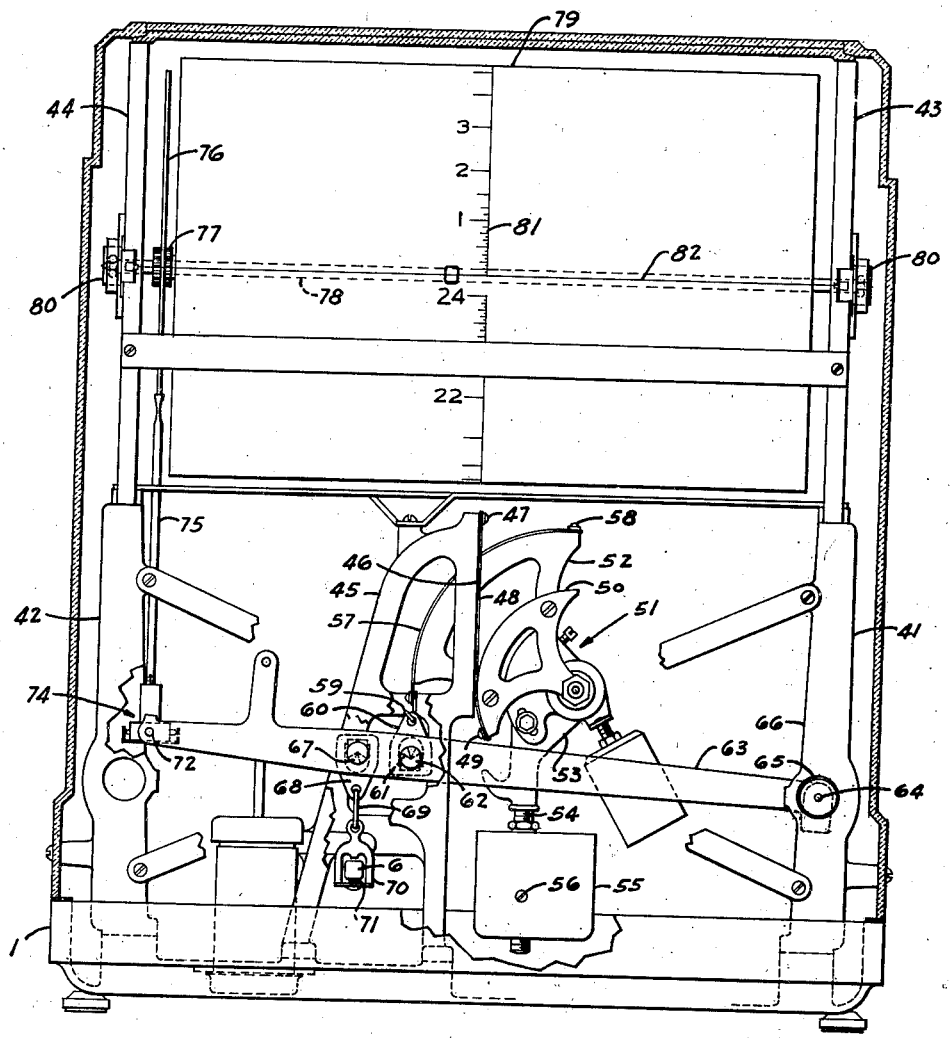
Fig. I
Halvor W. Hem
INVENTOR
BY Marshall & Marshall
ATTORNEYS May 6, 1941.                    H. W. HEM                    2,241,349
                             WEIGHING SCALE
                            Filed Aug. 9, 1939                 2 Sheets-Sheet 2
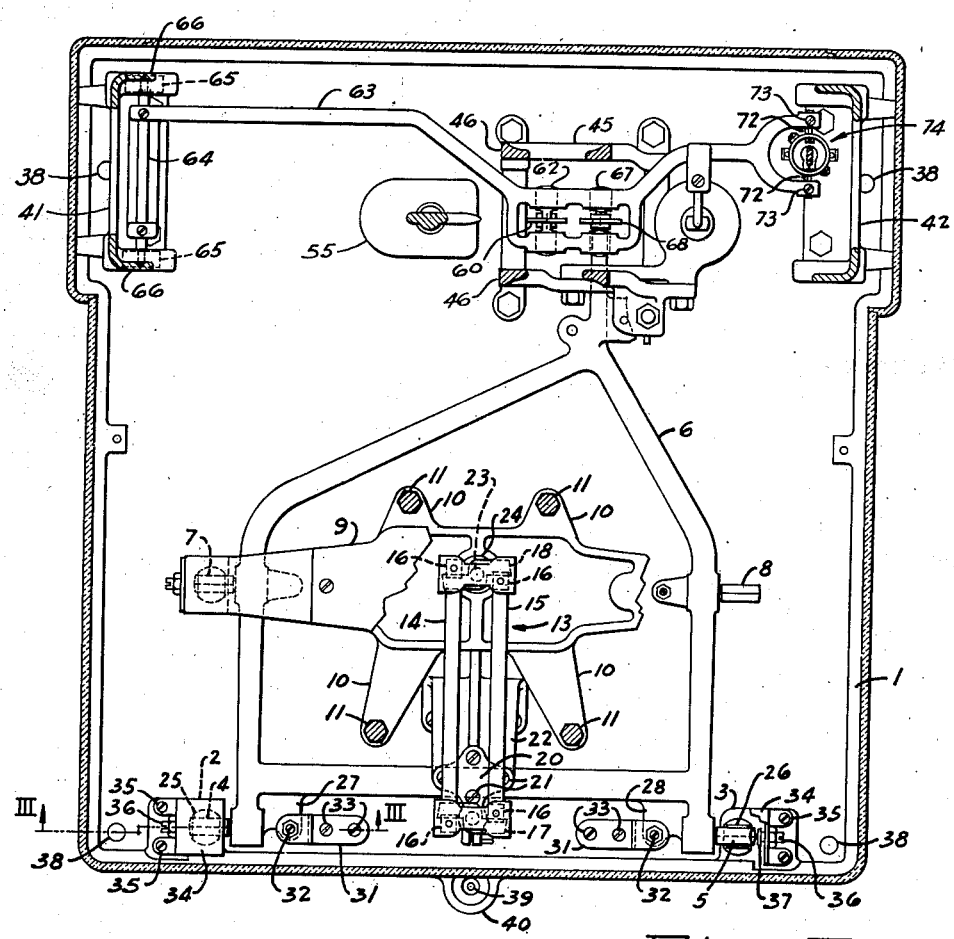
Fig. II
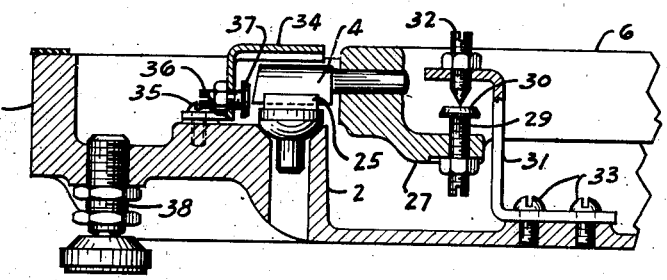
Fig. III
Halvor W. Hem
INVENTOR
BY Marshall & Marshall
ATTORNEYS Patented May 6, 1941

2,241,349

UNITED STATES PATENT OFFICE 2,241,349

WEIGHING SCALE

Halvor W. Hem, Toledo, Ohio, assignor to Toledo Scale Company, a corporation of New Jersey Application August 9, 1939, Serial No. 289,195

2 Claims. (Cl. 308—2)

This invention relates to weighing scales, and more particularly to weighing scales for use in retail shops.

The principal object of the invention is the provision of improved means for retaining the fulcrum pivots of the main lever in constant engagement with their bearings.

A further object of the invention is the provision of improved means for accurately adjusting such retaining means.

These, and other objects and advantages will be apparent from the following description, in which reference is had to the accompanying drawings illustrating a preferred embodiment of the invention and wherein similar reference numerals refer to similar parts throughout the several views.

In the drawings:

Fig. I is a rear elevational view of the scale, the housing being broken away so that a clearer view may be had of the mechanism.

Fig. II is a plan view of the scale, the housing and portions of the mechanism being broken away to more clearly show the construction of the lever fulcrum arrangement; and, Fig. III is a fragmentary sectional elevation of the lever fulcrum arrangement sectioned along the line III—III of Fig. II.

Referring to the drawings in detail:

A base 1 of the scale is preferably in the form of a rigid casting, integral therewith are fulcrum stands 2 and 3 upon which is mounted, by means of knife edged pivots 4 and 5, a lever 6 of the second order. This lever 6 is of skeleton form and is provided near its center with upwardly turned pivots 7 and 8 which are adapted to support bearings of a spider 9. The spider 9 has four horizontally extending arms 10 in which upwardly projecting posts 11 are studded for supporting a commodity receiver (not shown).

The condition of level of the spider 9, as well as of the commodity receiver which is mounted thereon, is maintained by means of a check link 13 located above the spider 9. This link consists of a pair of "pull" members 14 to prevent the spider from tilting in one direction and a pair of "push" members 15 to prevent it from tilting in the opposite direction. The bearings 16, alignably positioned between the two members 14 and the two members 15, engage oppositely facing knife edges of pivots 17 and 18. The pivot 17 is riveted to a stud which is threaded into a block 20 and suitably locked in adjusted position. The block 20, by means of screws 21, is adjustably positioned on the upper face of a bracket 22 bolted to the base 1. The pivot 18 is similarly riveted to the end of a stud 23 which is threaded into a boss 24 projecting up from the spider 9. By manipulating the screws 21 the block 20 is adjusted until the distance between the knife edges of the pivots 17 and 18 is equal to the distance between the pivots 4, 5 and 7, 8. This construction forms a force parallelogram of known type.

To prevent disengagement of the pivots 4 and 5 and the bearings 25 and 26, in which they rest, the lever 6 is provided with web-like inwardly projecting extensions 27 and 28 through which adjustable bearings 29, having hardened and ground flat heads 30, are threaded. These screws are adjusted until their flat faces lie in the plane with the edges of the pivots 4 and 5. Z-shaped brackets 31 are bolted to machined pads on the base in such a position that one of the arms overlies the surface of the screw head 30. A retaining screw 32, having a conical point, is threaded through the overlying portion of the bracket 31 and is adjusted until its point just touches the head 30. This screw is then securely locked in position by a locknut. To accurately position the brackets 31 so that the points of the conical ends of the screws 32 are collinear with the edges of the pivots 4 and 5, each of the screws 32 in turn is carefully turned downwardly so that pressure is exerted on the head 30. If the point is not collinear with the edges of the aforementioned pivots in the lever, but is located to one side, a movement of the lever in one direction will be observed and if it is located on the other side of the pivot edge, movement in the opposite direction will be observed. By moving the brackets 31 back and forth until no movement of the lever is observed when either of the screws 32 is carefully turned into engagement with the head 30, the exact point of adjustment is found. The brackets 31 are then securely locked to machined pads on the bottom of the base by means of screws 33. To prevent excessive lateral shifting of the lever 6 covers 34, which are bolted to suitable pads on the base 1 by means of screws 35, have thrust screws 36 threaded through their vertical walls. These thrust screws are provided with flat hardened heads 37 to antifrictionally engage thrust points formed on the ends of the edges of pivots 4 and 5.

Each of the four corners of the base 1 is provided with a leveling screw 38 and a capsular spirit level 39 is set in a projecting lip 40 of the base 1 for the usual purpose.

For supporting the load counterbalancing and indicating mechanisms there are bolted to each corner of the opposite end of the base upstanding frames 41 and 42, and surmounting these frames are substantially circular casing spiders 43 and 44.

Located within the area defined by the corners of the frames 41 and 42 and bolted to the base is a sector guide 45. This sector guide, which is a skeleton casting, has two straight vertical tracks 46 to which are clamped, by means of screws 47, the upper ends of flexible metallic ribbons 48. The lower ends of these ribbons overlie and are clamped, by means of screws 49, to arcuate faces of fulcrum sectors 50 which form a part of a load counterbalancing pendulum 51. The pendulum 51, in addition to the fulcrum sectors 50, comprises a power sector 52, a pendulum body 53, a depending stem 54 which is studded into a portion of the body 53 and a pendulum weight 55 which is adjustably mounted on the stem 54 and which is provided with a set screw 56 so that it may be locked in proper position. The usual means for adjusting the relative position of the parts are provided.

To operatively connect the pendulum 51 to the base lever mechanism a ribbon 57 overlies the arcuate face of the power sector 52 to which its upper end is clamped by means of a screw 58. The lower end of this ribbon is secured to a hook-like member 59 whose hook portion engages a stirrup 60 provided with a V bearing 61 engaging a power pivot 62 extending between furcated portions of an operating lever 63. One end of the lever 63 has fixed therein a shaft 64 which is mounted in ball bearings 65 positioned in flange-like sides 66 of the frame 41. This shaft and the ball bearings 65 form an antifriction fulcrum of the lever 63. In spaced relation to the pivot 62 and also extending between the furcations of the lever 63 is a load pivot 67 whose edge engages a bearing in a stirrup 68. The stirrup 68 is connected through a link 69 to a stirrup 70 provided with a suitable bearing for the reception of a cone pivot 71 fixed in the nose end of the lever 6.

To operatively connect the mechanism thus far described to load indicating means the free end of the lever 63 is bifurcated and provided with aligned reamed holes in which pins 72, having turned down hardened and ground portions, are locked by means of screw 73. These turned down portions of the pins enter suitably positioned aligned holes in a Gimbal ring assembly 74 which supports the lower end of a rod 75 whose upper end is fixed to a rack 76. The teeth of the rack 76 engage teeth of a pinion 77 circumjacently mounted upon a chart shaft 78 immediately adjacent one end of a cylindrical weight indicating chart 79. This chart is of the usual construction. The ends of the shaft 78 are rotatably mounted in ball bearings 80 secured to the substantially circular casing spiders 43 and 44.

In scales of the Roberval type care must be taken to proportion the levers and the load receiver or platter in such a manner that no disengagement of the platter spider bearings and the lever pivots take place when a load is placed near the edge of the platter. This is usually accomplished by making the platter small so that the load, no matter where placed thereon, is always for the greater part within the area defined by the lever pivots. In scales of the type herein described however, the platter projects a considerable amount beyond the ends of the pivots.

The platter or load receiver (not shown in the drawings) rests on the upwardly projecting posts 11 in the arms 10 of the load receiver spider 9 and the bearings of this spider are prevented from disengaging from the lever pivots by retaining means such as are shown in Patent No. 1,685,780 to H. O. Hem.

When, as in the present invention, the platter projects a considerable distance beyond the fulcrum pivots of the lever, there is also a tendency of the lever fulcrum pivots disengaging from their bearings. A number of constructions have been suggested to prevent this tipping; these constructions, however, contribute friction to the scale if they comprise rollers or other means and if they comprise pivots and bearings when the adjustment is not exact, a condition that is very difficult to obtain. In the present invention it should be obvious that the threaded aperture for the adjustable bearings 29 need not be located with more than reasonable accuracy since the conical point of the screw 32, which forms the retaining pivot, may be very accurately located along the pivot line in the manner described without microscopical measurements, by merely observing indicator movement when the conical point of the member 32 is carefully brought into engagement 30 of the bearing 29.

The operation of the scale is similar to that of other types of pendulum cylinder scales. When a load is placed on the platter the lever 6 is depressed and the force transmitted through the stirrups 68 and 60 to the operating lever 63. This, under the action of the force, moves downwardly about its fulcrum and transmits a proportional amount of the force through its power pivot 71, stirrups 70 and 68 to the operating lever 63. This also, under the action of the force, rocks about its fulcrum and transmits a proportional amount of the force through the ribbon 57 to the pendulum 51. This, in the well known manner, moves outwardly and upwardly until its weight moment equals the weight moment occasioned by the load. The rack 76 partakes of the movement of the lever 63 and translates the reciprocatory motion of the lever into rotation with the cooperation of the pinion 77 and rotates the chart 79 through an angle proportional to the weight of such load or until the graduation in a series 81, representing the weight of the load, is in registration with an index line 82 which is stretched in front of the chart 79.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, a base, an upwardly directed bearing mounted on said base, a lever, a knife-edged fulcrum pivot fixed in said lever and engaging said bearing on said base, a shelf-like projection extending laterally from said lever, a flat faced bearing adjustably threaded in said shelf-like projection so that the center of its flat face lies substantially in the intersection of planes passing vertically and horizontally through the line of engagement of the knife edge of said fulcrum pivot and said bearing on said base, a bracket secured to said base having a portion overhanging said flat faced bearing and a threaded member having a conical point threaded through said overhanging portion so that its conical point engages such flat face of said bearing in the intersection of such aforementioned planes.

2. In a device of the class described, in combination, a base, bearings having upwardly directed faces mounted on said base, a two-armed load supporting lever having a downwardly directed knife-edged pivot located in each of said arms of said lever, said knife-edged pivots being oscillatably mounted on said bearings on said base, an upwardly faced bearing adjustably mounted on each arm of said lever adjacent said knife-edged pivots with its bearing face in the horizontal plane of the bearing faces of said bearings mounted on said base, a bracket adjustably mounted on said base adjacent each of the bearings mounted on said lever, and cone pivots adjustably seated in said brackets for engaging the bearings which are adjustably mounted on each arm of said lever.

HALVOR W. HEM.